United States Patent [19]  
Cichowski

[11] 3,862,910  
[45] Jan. 28, 1975

[54] OXIDATIVE DEHYDROGENATION CATALYST AND PROCESS OF PREPARATION THEREOF

[75] Inventor: Robert S. Cichowski, San Luis Obispo, Calif.

[73] Assignee: Phillips Petroleum Company, Bartlesville, Okla.

[22] Filed: July 20, 1973

[21] Appl. No.: 381,019

Related U.S. Application Data

[62] Division of Ser. No. 109,010, Jan. 22, 1971, Pat. No. 3,766,191.

[52] U.S. Cl............. 252/435, 252/437, 260/680 E  
[51] Int. Cl............................................. B01j 11/82  
[58] Field of Search............................ 252/435, 437

[56] References Cited  
UNITED STATES PATENTS  
2,870,228   1/1959   Armstrong...................... 252/437 X  
3,342,820   9/1967   Brader............................ 252/435 X Primary Examiner—H. Sneed

[57] ABSTRACT

Oxidative dehydrogenation of organic compounds is carried out in the presence of a potassium/iron/phosphorus/oxygen catalyst composition. A method of preparing the catalyst composition comprising associating potassium with iron and subsequently associating the potassium-iron composite with phosphorus.

9 Claims, No Drawings

OXIDATIVE DEHYDROGENATION CATALYST AND PROCESS OF PREPARATION THEREOF

This application is a division of copending application Ser. No. 109,010, filed on Jan. 22, 1971, now U.S. Pat. No. 3,766,191.

FIELD OF INVENTION

This invention relates to an oxidative dehydrogenation catalyst, a catalytic oxidative dehydrogenation process, and a method of making an oxidative dehydrogenation catalyst.

DESCRIPTION OF PRIOR ART

Thermal dehydrogenation of organic compounds, well known in the art, frequently causes undesirable side reactions and significantly reduces end product selectivity. Catalytic dehydrogenation processes have been developed which exhibit at least one, sometimes two, but infrequently all three of the following characteristics: minimal side reactions, maximal reaction conversion rates, and maximal end product selectivity. The problem constantly facing the art is the development of commercial catalytic process which exhibit not just one or two but all three of the aforementioned characteristics. Processes known to the art as oxidative dehydrogenation comprise processes that remove hydrogen from organic compounds in the presence of molecular oxygen. Catalytic oxidative dehydrogenation processes provide an excellent means of preparing numerous organic compositions of significant value to the chemical industry.

It is an object of this invention to catalytically oxydehydrogenate organic compounds under process conditions which yield minimal side reactions, maximal conversion rates and maximal end product selectivity.

SUMMARY OF INVENTION

According to this invention improved oxidative dehydrogenation catalysts containing potassium/iron/phosphorus and oxygen are produced when potassium is associated with iron prior to incorporating the phosphorus.

In one embodiment of this invention it has been found that an improved potassium/iron/phosphorus/oxygen oxidative dehydrogenation catalyst is prepared in accordance with the following sequence: (1) intimately mixing a potassium compound with an iron compound, (2) calcining the potassium/iron mixture, (3) intimately mixing the calcined potassium/iron composition with a phosphorus compound and thereafter (4) calcining the potassium/iron/phosphorus-containing composite.

(1) The first step comprises contacting and intimately mixing a suitable amount of an oxide of potassium or a compound convertible to potassium oxide on calcination with a suitable amount of an oxide of iron or a compound convertible to iron oxide on calcination. The term "calcination" as used herein is used to describe broadly the heating of any substance, such as an element, compound, composite, composition, a catalyst or mixtures thereof to an elevated temperature in the presence of an oxygen-containing gas, such as air.

Compounds convertible to an oxide of potassium under calcining conditions are exemplified by the following compounds: (a) inorganic potassium compounds such as potassium hydroxide, potassium nitrate; potassium nitrite, potassium carbonate, potassium bicarbonate, potassium cyanate; and (b) organic potassium compounds such as potassium oleate, potassium oxalate, potassium phenolate, potassium phthalate, potassium salicylate, potassium succinate, potassium tartrate, potassium acetate, and the like.

Compounds convertible to an oxide of iron under calcining conditions are exemplified by the following compounds: (a) inorganic iron compounds such as iron carbonate, iron hydroxide, iron nitrate, iron nitride, and (b) organic iron compounds such as iron acetate, iron formate, iron oleate, iron oxalate, iron phenolate, iron stearate and the like.

The means chosen to prepare mixtures of potassium and iron is not limiting upon the present invention. Convenient methods of preparing intimate mixtures of potassium and iron are (a) dry mixing powdered compounds of the potassium and iron, or (b) wet mixing solutions or dispersions of potassium and iron compounds. Preferentially, prior to calcination the mixtures are dried and volatile solvents are removed.

In the preparation of potassium/iron compositions, the potassium content by weight and the iron content by weight are within the weight ratio range of from about 0.005:1 to 0.15:1. Preferentially, optimum results are obtained wherein the weight ratio range of potassium to iron is from about 0.01:1 to 0.05:1.

(2) The second step comprises calcination of the potassium/iron mixtures having the weight ratios specified in step (1) above at an elevated temperature range of from about 1,600°F to about 2,000°F for 0.1–30 hours.

In theory, not to be construed as limiting the scope of this invention, it is believed that the combination of potassium and iron under calcining conditions causes the formation of at least some quantity of a potassium ferrite compound having a beta-alumina structure, i.e., $KFe_{11}O_{17}$ (also written as $K_2O.11\ Fe_2O_3$). It is presently believed that this beta-alumina structure is necessary in order to satisfactorily incorporate the potassium into the catalyst compositions of this invention.

(3) The third step comprises association of the calcined potassium/-iron composition with a sufficient quantity of a suitable phosphorus-containing compound to provide a phosphorus content of from 1 to 5 times, preferably 1 to 2 times, the stoichiometric amount required to react with all of the iron in the form of phosphate ions ($PO_4^{-3}$). Preferably, the phosphorus content of the calcined potassium/iron/phosphorus composite is higher than that calculated for an iron compound containing only phosphate ions. The stoichiometric amount of phosphorus in relation to iron, computed as ferric phosphate, $FePO_4$, is one atom of phosphorus per atom of iron, and is 20.5 percent by weight phosphorus based on the weight of $FePO_4$. Examplary forms of suitable phosphorus containing compounds include phosphoric acid; phosphorus oxides, such as phosphorus pentoxide; or any compound convertible to a phosphorus oxide on calcination. Because of its convenient form and ready commercial availability phosphoric acid is a preferred source of phosphorus.

(4) The fourth step after incorporation of phosphorus as specified in step (3) above, comprises calcination of the potassium/iron/phosphorus composition in air or an oxygen containing gas at an elevated temperature of about 800°F to 1,400°F for 1–25 hours. A calcination temperature of about 1100°F to 1300°F for 2–8 hours is satisfactory in most instances for the preparation of the catalysts of this invention.

The potassium/iron/phosphorus/oxygen catalysts of this invention can be used in any suitable oxidative dehydrogenation process. Usually operating conditions include a temperature in the range of from about 750° to about 1,300°F, preferably from 950°F to 1,100°F; a pressure in the range of from about 0.05 to about 250, preferably from 0.1 to 100 psia; a volumetric oxygen-:organic compound feed ratio in the range of from about 0.1/1 to about 3/1, preferably from 0.5/1 to 2/1; and, if steam is used, a volumetric steam:organic feed ratio in the range of about 0.1/1 to about 100/1, preferably 5/1 to 20/1. Organic compound feed space rates (volumes of organic compound vapor/volume of catalyst/hour, at 32°F, 14.7 psia) are selected in the range from about 50 to about 5,000, preferably from 100 to about 2,500.

In the broad embodiments of this invention the oxidative dehydrogenation processes of this invention include dehydrogenation of various unsaturated organic compounds that contain at least 3 carbon atoms and at least one

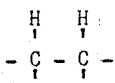

grouping, i.e., adjacent carbon atoms singularly bonded to each other and each attached to at least one hydrogen atom. Among the class of unsaturated organic compounds which can be dehydrogenated by means of the novel process of this invention are alkenes, cycloalkenes, alkyl and alkenyl substituted aromatic compounds, alkyl and alkenyl substituted pyridine compounds.

Suitable alkene compounds include alkenes having from 3 to 10 carbon atoms, preferably 4 to 6 carbon atoms. Representative alkenes include propylene, butene-1, butene-2, isobutylene, pentene-1, 2-methylbutene-1, 2-methylbutene-2, 3-methylbutene-1, hexene-1, heptene-1, octene-1, and 2,4,4-trimethylpentene-1 and mixtures thereof.

Suitable cycloalkenes include those having from 4 to 10 carbon atoms preferably from 4 to 6 carbon atoms. Representative cycloalkenes include cyclobutene, cyclopentene, cyclohexene, cyclooctene, 3-isobutylcyclopentene, 3-propylcyclohexene, and the like, and mixtures thereof.

Suitable alkyl and alkenyl substituted aromatic compounds include compounds containing from 8 to 16 carbon atoms, preferably from 8 to 14 carbon atoms. Representative aromatic compounds include such compounds as ethylbenzene, propylbenzene, isobutylbenzene, 1-methyl-2-propylbenzene, 1-butyl-3-hexylbenzene, isopropylbenzene, 3-phenylcyclopentene-1, 3-ethylbiphenyl, 1,4-diethylbenzene, 4-ethylstyrene, 1,2-dimethyl-4-propylbenzene, 2-pentenylbenzene.

Suitable alkyl and alkenyl substituted pyridine compounds include ethylpyridine, 2-methyl-5-ethylpyridine, 2,3,4-trimethyl-5-ethylpyridine, 2-ethyl-5-hexylpyridine, 2-ethylquinoline, 2-pentenyl-3-acridine.

Preferred unsaturated organic compounds within the scope of this invention contain at least 4 carbon atoms which contain a single

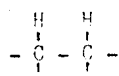

grouping, i.e., adjacent carbon atoms singularly bonded to each other and each attached to at least one hydrogen atom. Included among the preferred unsaturated aliphatic, aromatic and heterocyclic organic compounds oxydehydrogenated in accordance with the process of this invention are 2-methylbutene-2, butene-1, ethylbenzene, and 2-methyl-5-ethylpyridine.

The molecular oxygen-containing gas employed in the oxydehydrogenation processes of this invention can be present as such, or with inert diluents such as nitrogen. Suitable molecular-oxygen containing gases include air, flue gases containing residual oxygen, and oxygen-containing steam. If desired, pure or substantially pure oxygen can also be employed.

The oxydehydrogenation process of this invention can be carried out by passing a feedstock mixture, preferably preheated, of organic compound over the catalysts of this invention. Recycle of unconverted organic compound feed and/or steam condensate can be employed if desired; however, the conversion rates and selectivity of this invention are generally sufficiently high to eliminate necessity for recycle.

The catalyst of the invention, particularly when steam is used, can be used for long periods without reactivation, however, when and if reactivation becomes necessary, it can be effected by simply stopping the flow of organic feed and allowing the flow of the oxygen containing gases of the feed mixture, such as air and steam, to continue for a suitable reactivation time.

Over prolonged periods of catalytic service, some portion of the phosphorus content of the original K/Fe/P/O composite can be lost with a resultant decrease in catalyst efficiency. To improve catalyst efficiency small quantities of phosphorus containing compounds can be intermittently or continuously introduced to the catalyst system. The phosphorus content of the catalyst system can be maintained at any desired level by addition of phosphorus to the feedstock. Any loss of phosphorus can be measured by analysis of the reaction product effluent. Exemplary of compounds which can be employed to add phosphorus to the catalyst systems include such compounds as phosphoric acid, phosphorus pentoxide, other phosphorus acids and/or anhydrides as well as organo-substituted phosphines. The form of the phosphorus-containing compound is not essential nor limiting upon the catalyst systems or processes of this invention.

The catalysts of this invention can be employed in many forms and may be prepared by those skilled in the art in the form of granules, pellets, or catalytic forms supported or diluted by silica, alumina, boria, magnesia, titania, zirconia.

In the following examples the conversion and percentage selectivity values were obtained from gas chromatograph data and the results are shown in mole percent. Accordingly, the selectivity designated is a gas phase value. Small quantities of material remaining in the steam condensate receiver following the reactor were neglected and are not reported.

EXAMPLE I

A 100 g quantity of $Fe_2O_3$ powder and 9.1 g of $K_2CO_3$ were dispersed in distilled water, the water evaporated, and the mixture calcined at 1,750°F for 24 hours. A 30 g portion of this material, believed to comprise $KFe_{11}O_{17}$, was then treated with 40 cc of 85% $H_3PO_4$, heated on a hot plate at 200°F for 15 minutes, and then calcined at 1,200°F for 4 hours. The catalytic composition was then screened to about a 20–28 mesh particle size and was then employed in Example III.

EXAMPLE II

For purposes of comparison, a similar K-containing catalytic iron phosphate composition was prepared except that the potassium was incorporated differently. The potassium was incorporated into a pre-formed iron phosphate.

A 30 g quantity of $Fe_3(PO_4)_2$ was treated with a mixture of 7 cc of 80% $H_3PO_4$ and 3 g of $KNO_3$ in about 40 cc of distilled water. The resulting slurry was dried, and then calcined at 1,200°F for 4 hours. The comparison catalyst composition was screened to about 20 to 28 mesh particle size and was then employed in Example III.

EXAMPLE III

Catalytic compositions prepared in accordance with Examples I and II were tested for oxidative dehydrogenation of 2-methylbutene-2 to isoprene. The 2-methylbutene-2 was introduced at 400 gaseous/hourly/space/velocity (GHSV), air was introduced at 2,000 GHSV, and steam was introduced at 10,000 GHSV. The reaction was carried out at atmospheric pressure and at a temperature of 1,050°F. The results are as follows:

TABLE I

OXIDATIVE DEHYDROGENATION OF ISOAMYLENE TO ISOPRENE

| Run | Catalyst | %Fe. | %P. | %K | Conversion/Modivity (1) 15 min. | 6 hrs. | 12 hrs. |
|---|---|---|---|---|---|---|---|
| 1 | Example I Catalyst | 28.0 | 27.0 | 1.7 | 26/92 | 65/87 | 64/88 |
| 2 | Example I Catalyst | 28.0 | 27.0 | 1.7 | 40/84 | 73/86 | 71/86 |
| 3 | Example II Catalyst | 32.0 | 21.8 | 3.9 (2) | 4/99 | 7/100 | 12/99 |

(1) Modivity is a simplified selectivity based on gas phase products only.
(2) Tested at 200, 1000, 5000 GHSV for feed, air, steam respectively.

The above data shows that the sequence of steps followed in the catalyst preparation is important. Comparison of Run 1 data with comparison of Run 3 data illustrates that incorporating the potassium by first associating it with the iron and then with the phosphorus gives superior results compared with the method of incorporating the potassium by associating it with a preformed iron phosphate.

What I claim is:

1. A method of preparing a catalyst comprising the following process sequence:
   a. contacting a potassium compound and an iron compound in the absence of phosphorus;
   b. calcining the resulting potassium/iron mixture;
   c. contacting the thus calcined potassium/iron mixture with a phosphorus compound; and
   d. calcining the resulting potassium/iron/phosphorus mixture; said potassium, iron and phosphorus compounds being the oxides or compounds convertible to the oxides on calcination.

2. A method in accordance with claim 1 wherein
   a. the potassium and iron are present in a weight ratio in the range of about 0.005:1 to about 0.15:1,
   b. the calcining of said potassium/iron mixture is carried out at a temperature in the range of about 1,600°F to about 2,000°F,
   c. the phosphorus compound is present in an amount in the range of about 1 to about 5 times the stoichiometric amount required to react with all the iron in the form of phosphate ions, and
   d. the calcining of said potassium/iron/phosphorus mixture is carried out at a temperature in the range of about 800°F to about 1,400°F.

3. A method in accordance with claim 1 wherein said potassium compound is $K_2CO_3$, said iron compound is $Fe_2O_3$, and said phosphorus compound is $H_3PO_4$.

4. A method in accordance with claim 1 for preparing an oxidative dehydrogenation catalyst composite which consists essentially of potassium, iron, phosphorus, and oxygen, which comprises the sequential steps of:

a. contacting, in the absence of phosphorus, a potassium compound with an iron compound, the weight ratio of potassium to iron being in the range of about 0.005:1 to about 0.15:1;
   b. calcining the thus-contacted potassium compound and iron compound at a temperature within the range of about 1,600°F to about 2,000°F for a period of time in the range of about 0.1 to about 30 hours;
   c. admixing the thus-calcined composition containing potassium and iron with a phosphorus-containing compound, the phosphorus of said phosphorus-containing compound being present in an amount of 1 to 5 times the stoichiometric amount required to react with all of the iron in the form of a phosphate ion; and
   d. calcining the resulting admixture containing potassium, iron, and phosphorus at a temperature within the range of about 800°F to about 1,400°F for a period of time in the range of about 1 to about 25 hours.

5. A method in accordance with claim 4 wherein said potassium compound is $K_2CO_3$, said iron compound is $Fe_2O_3$, and said phosphorus-containing compound is $H_3PO_4$.

6. A catalyst composite which consists essentially of potassium, iron, phosphorus, and oxygen, and which is prepared by the sequential steps of:

a. contacting, in the absence of phosphorus, a potassium compound with an iron compound;
b. calcining the thus-contacted potassium compound and iron compound at a temperature within the range of about 1,600°F to about 2,000°F for a period of time in the range of about 0.1 to about 30 hours;
c. admixing the thus-calcined composition containing potassium and iron with a phosphorus-containing compound; and
d. calcining the resulting admixture containing potassium, iron and phosphorus at a temperature within the range of about 800°F to about 1,400°F for a period of time in the range of about 1 to about 25 hours;

said potassium, iron, and phosphorus compounds being the oxides or compounds convertible to the oxides on calcination.

7. A catalyst composite in accordance with claim 6 wherein the potassium and iron are present in a weight ratio in the range of about 0.005:1 to about 0.15:1 and the phosphorus is present in an amount in the range of about 1 to about 5 times the stoichiometric amount required to react with all the iron in the form of phosphate ions.

8. A catalyst composite in accordance with claim 6 wherein said potassium compound is $K_2CO_3$, said iron compound is $Fe_2O_3$, and said phosphoruscontaining compound is $H_3PO_4$.

9. A catalyst composite in accordance with claim 7 wherein said potassium compound is $K_2CO_3$, said iron compound is $Fe_2O_3$, and said phosphorus-containing compound is $H_3PO_4$.

* * * * *